(12) United States Patent
Gottlieb

(10) Patent No.: US 6,298,431 B1
(45) Date of Patent: *Oct. 2, 2001

(54) BANKED SHADOWED REGISTER FILE

(75) Inventor: Robert Steven Gottlieb, Sunnyvale, CA (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/001,412

(22) Filed: Dec. 31, 1997

(51) Int. Cl.[7] ................................................ G06F 13/14
(52) U.S. Cl. ................... 712/28; 712/5; 712/32; 712/33; 709/108
(58) Field of Search ................... 712/228, 15, 4, 712/5, 32, 33, 108; 709/100, 108, 102; 711/145, 131, 151

(56) References Cited

U.S. PATENT DOCUMENTS

| | | | |
|---|---|---|---|
| 3,962,682 | * 6/1976 | Bennett | 340/172.5 |
| 4,935,929 | * 6/1990 | Sidman et al. | 371/22.3 |
| 4,954,988 | * 9/1990 | Robb | 365/189.02 |
| 5,325,487 | * 6/1994 | Au et al. | 395/250 |
| 5,388,219 | * 2/1995 | Chan et al. | 710/5 |
| 5,426,766 | * 6/1995 | Ogata | 711/5 |
| 5,572,692 | * 11/1996 | Murdoch et al. | 711/5 |
| 5,577,229 | * 11/1996 | Wakerly | 711/147 |
| 5,613,078 | * 3/1997 | Kishigami | 395/306 |
| 5,617,538 | * 4/1997 | Heller | 395/200.02 |
| 5,734,855 | * 3/1998 | Sato et al. | 712/219 |
| 5,748,911 | * 5/1998 | Maguire et al. | 710/101 |
| 5,787,243 | * 6/1998 | Stiffler | 395/182.11 |
| 5,835,925 | * 11/1998 | Kessler et al. | 711/2 |
| 5,838,986 | * 11/1998 | Garg et al. | 712/23 |
| 5,901,295 | * 5/1999 | Yazdy | 395/293 |
| 6,101,599 | * 8/2000 | Wright et al. | 712/228 |

* cited by examiner

Primary Examiner—Majid Banankhah
(74) Attorney, Agent, or Firm—Blakely, Sokoloff, Taylor & Zafman LLP

(57) ABSTRACT

An apparatus and method for improving processor performance during multithreaded processing based on the use of a banked shadowed register file for minimizing thread switch overhead.

24 Claims, 3 Drawing Sheets

BANKED SHADOWED REGISTER FILE

BACKGROUND OF THE INVENTION

1. Field of the Invention

The present invention relates generally to the field of microprocessors, and, more particularly, to a banked shadowed register file for minimizing thread switch overhead in multithreaded processing applications so as to improve processor performance.

2. Description of the Related Art

Improving processor performance is a paramount goal in the competitive field of microprocessing. Significant advances have been made in this regard by increasing the speed at which processors operate. Although increasing processing speed is generally advantageous in terms of providing a larger number of clock cycles per unit of time, a drawback nonetheless exists in that the speed of conventional processors now far outpaces the speed at which memory dependent operations can be performed. Depending upon the memory level and operation, this can result in significant memory-latencies. The resulting latencies cause pipeline stalls, which disadvantageously restrict processor throughput.

Multithreading is a processing technique designed to minimize the adverse effect f pipeline stalling on processor performance. As used herein, the term "thread" is defined as including an individual software program or independent sub-program generated when a full program is compiled. Threads are quite often dependent upon long latency operations, such as those associated with instruction fetches, cache misses, unresolved data dependencies, and branch latencies. These long latency operations typically cause the execution core of the processor to stall and remain idle for many cycles. Multithreading circumvents these idle cycles by reassigning the execution resources of the processor to one or more new threads when a currently executing thread stalls waiting for dependent operations. In this fashion, multithreading advantageously improves processor performance by hiding latencies with the performance of useful work cycles.

Multithreading may take one of three general forms. Course grained multithreading is characterized as having the processor support only one active thread at a time by limiting instructions from only one thread in the execution pipeline. Fine grained multithreading is characterized as having the processor support multiple active threads while issuing instructions from only one thread during a given clock cycle. Simultaneous mulithreading is characterized as having the processor issue and execute instructions from multiple threads during each clock cycle. In each instance, multithreading makes efficient use of the processor during clock cycles that would otherwise be wasted due to latencies.

Multithreading is particularly advantageous in server applications in that it can inexpensively boost throughput and do so without the need for multiple processors. The demand for inexpensive servers has increased rapidly in the recent past due, in part, to the proliferation of the Internet. To meet this demand, various servers have been designed with multiple processors for improving throughput. However, due to the dramatic drop in the cost of memory and disk-storage, providing multiple processors now represents a significant portion of the total cost of these servers. Multithreading overcomes this by providing the ability to simultaneously handle the individual tasks for a multitude of different users without requiring multiple processors. This is particularly advantageous in server applications such as on-line-transaction-processing, which may spend up to 30% of the processing time waiting for main memory to return data to the processor.

Conventional microprocessors are single-threaded in that they provide only one set of architectural registers, namely, a register file for maintaining a thread's architectural state during execution. As such, conventional processors are best suited for course grained multithreading since this type of multithreading requires supporting only one thread at a time. However, before another thread can begin, the current thread's state must be saved in memory so it can properly resume later. This process, referred to as a "thread switch," involves flushing the pipeline of instructions from the current thread, saving the thread's architectural state, and providing instructions from the new thread to the processor. The amount of time required to complete the thread switch process is referred as "thread switch overhead." Depending upon the number of registers and cache misses incurred, it may take a conventional processor hundreds of clock cycles to complete a thread switch. Course grained mulithreading using conventional processors is, therefore, only worthwhile when the memory latency to be avoided is sufficiently greater than the thread switch overhead.

One prior art technique for reducing thread switch overhead involves providing each thread with its own set of architectural registers. This approach suffers a significant drawback, however, in that adding extra register files on the processor requires establishing a direct connection between the processor's execution core and each newly added register file. With the advances in integrated circuit manufacturing, the space consumed by the direct connections between the extra register files and the execution core cuts significantly into the total amount of transistors that can be provided on the processor. As such, adding a separate register file for each thread is not cost effective in that it consumes a substantial amount of space in order to couple each register to the execution core of the processor.

What is needed therefore is an apparatus and method for reducing thread switch overhead in a course grained multi-threaded application which effectively improves processor efficiency while consuming negligible space on the processor.

SUMMARY OF THE INVENTION

In one broad aspect of the present invention, a banked shadowed register file is provided for minimizing thread switch overhead. The banked shadowed register file includes at least one supplemental register cell associated with each register cell of a standard register file. Transmission means are also provided for selectively transferring thread information between at least one register cell of the standard register file and the at least one supplemental register cell.

In a still further aspect of the present invention, a method is disclosed for improving processor performance. The method includes the first step of providing at least one supplemental register cell associated with each register cell of a standard register file. The method includes the further step of selectively transferring thread information from at least one register cell of the standard register file into the supplemental register cell to minimize thread switch overhead.

BRIEF DESCRIPTION OF THE DRAWINGS

Other objects and advantages of the invention will become apparent upon reading the following detailed description and upon reference to the drawings in which.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
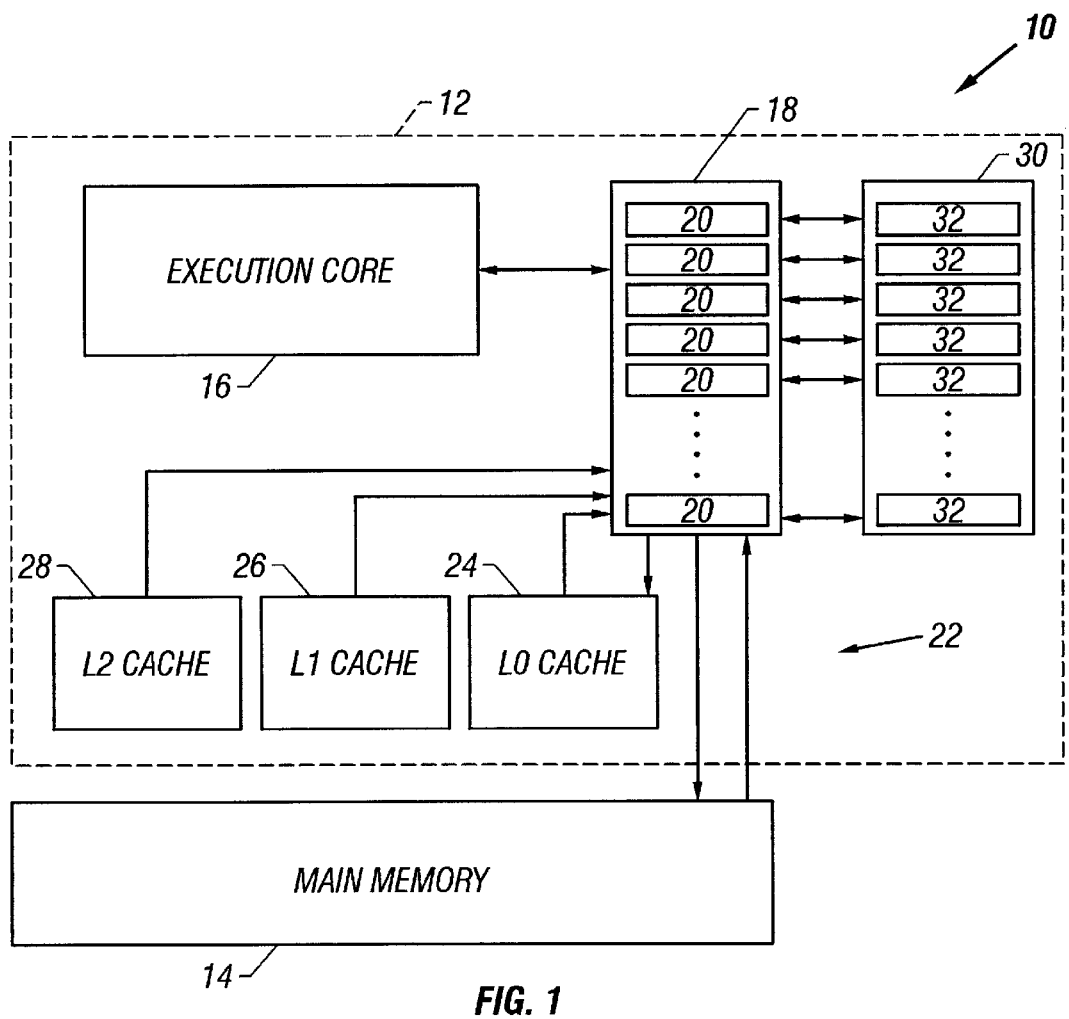
FIG. 1 is a block diagram of a microprocessing system having a banked shadowed register file in accordance with the present invention.

Referring to FIG. 1, shown is a block diagram of one embodiment of a microprocessing system 10, including an apparatus suitable for reducing thread switch overhead in a course grained multithreading application in accordance with the present invention. In the disclosed embodiment, the microprocessing system 10 generally includes a microprocessor 12 coupled to a main memory 14. More specifically, the microprocessing system 10 includes an execution core 16, a standard register file 18 containing multiple register cells 20, and a memory system 22 comprising an L0 cache 24, an L1 cache 26, an L2 cache 28, and the main memory 14. In accordance with the present invention, the microprocessing system 10 includes a banked shadowed register file 30 communicatively coupled to the standard register file 18. As will be set forth below, the banked shadowed register file 30 is capable of storing a plurality of inactive threads such that multiple thread switch operations can be performed quickly and efficiency on the microprocessor 12, thereby reducing thread switch overhead for improved processor performance.

The object of multithreading is to hide latencies with the performance of useful work. Multithreading seeks to accomplish this by reassigning the processor's execution resources to a new thread when a currently executing thread stalls waiting for dependent operations. As noted above, this thread switch process requires the discrete steps of flushing the pipeline of instructions from the current thread, saving the current thread's architectural state, and providing instructions from the new thread to the execution core. The banked shadowed register file 30 of the present invention provides the ability to perform the latter two steps (saving the current thread's architectural state and providing instructions from the new thread to the execution core) without accessing the memory system 22. In this fashion, the banked shadowed register file 30 minimizes the time required to perform a thread switch.

Minimizing thread switch overhead improves processor performance because it maximizes the amount of time available for the newly switched thread to perform useful work. This relationship can be represented by the equation: W=L−TSO, where W is the amount of useful work that a new thread can perform, L is the latency that prompted the thread switch, and TSO is the thread switch overhead. The banked shadowed register file 30 of the present invention reduces the amount of time required to effectuate a thread switch by eliminating the need to access the memory system 22 to accomplish the steps of saving the current thread's architectural state and providing instructions from the new thread to the execution core. Reducing the thread switch overhead (TSO) effectively increases the amount of latency time (L) that can be used for useful work (W). For example, if a latency of 300 clock cycles is encountered, the amount of time that can be devoted to useful work (W) following a thread switch is 300 clock cycles less the time required to effectuate the thread switch (TSO). Minimizing the thread switch overhead thereby reduces the extent to which the processor's execution core 16 will be idling due to latencies so as to improve the overall performance of the microprocessor 12.

The banked shadowed register file 30 accomplishes this by providing a banked shadowed register block 32 corresponding to each standard register cell 20, as well as a controller (not shown) for controlling the transfer of threads between the banked shadowed register file 30 and the standard register file 18. As will be explained in greater detail below, each banked shadowed register block 32 includes a group of individual register cells (not shown) for storing a plurality of inactive threads on the microprocessor 12. In this fashion, the active thread in the standard register file 18 may be switched with any of the inactive threads in the banked shadowed register file 30 without incurring the lofty thread switch overheads associated with accessing the memory system 22. Because a new thread can be quickly switched in, the processor's execution core 16 spends less time stalled waiting for memory returns which, in turn, improves processor performance. The banked shadowed register file 30 of the present invention also accomplishes this inexpensively, without the need for multiple processors or additional registers coupled directly to the execution core 16.

Figure 2:
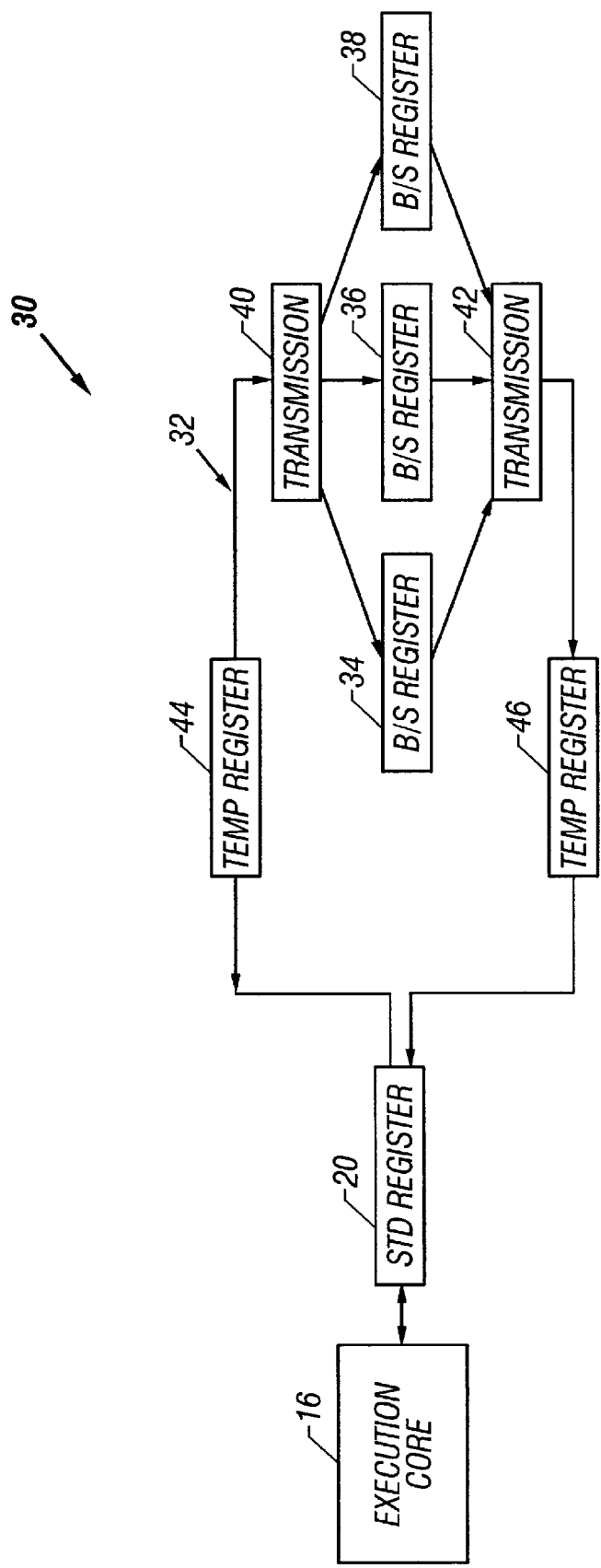
FIG. 2 is a block diagram of the banked shadowed register file in accordance with one embodiment of the present invention.

Referring now to FIG. 2, shown is a block diagram illustrating the banked shadowed register file 30 in accordance with one embodiment of the present invention. For each register cell 20 in the standard register file 18, the banked shadowed register file 30 comprises a first register 34, a second register 36, a third register 38, first and second transmission gates 40, 42, and first and second temporary registers 44, 46. In conjunction with the register cells 20 of the standard register file 18, the register cells 34–38 of the banked shadowed register file 30 provide the ability to switch between four separate threads without accessing the memory system 22. These individual threads may be threads in the same task or threads from different tasks. In the illustrated embodiment, only one of the four threads can be active at a time, namely the thread disposed within the standard register file 18. Although shown supporting four separate threads, it is to be readily understood that the constituent components of the banked shadowed register file 30 can be increased or decreased to handle additional or fewer threads or users without departing from the spirit and scope of the invention.

The first and second temporary registers 44, 46 are provided for temporarily storing thread information being transferred between the standard register cell 20 and the banked shadowed registers 34–38. Employing the temporary registers 44, 46 makes it necessary to perform two distinct transfers, consuming at least two clock cycles, to transfer thread information between the standard register file 18 and the banked shadowed register file 30. This is advantageous in that it prevents the possibility of inadvertently overwriting the thread information being transferred. As will be appreciated, this is necessary so that the integrity of the thread information is not jeopardized during a thread switch operation.

The first and second transmission gates 40, 42 are mutually exclusive and selectively operable such that, at any given time, the exchange of thread information is isolated between the standard register 20 of the standard register file 18 and only one of the registers 34–38 in the banked shadowed register file 30. As such, the first transmission gate 40 directs the thread information passing from the first temporary register 44 into either the first register 34, the second register 36, or the third register 38, depending upon which thread switch is desired. The controller (not shown) for selecting which thread to switch will be discussed in greater detail below. The second transmission gate 42 operates in similar fashion, directing the thread information from one of the first, second, and third registers 34–38 of the banked shadowed register file 30 into the second temporary register 46, depending upon the desired thread switch operation.

For purpose of discussion, the operation of the banked shadowed register file 30 will be described within the context of a single thread switch between the first banked shadowed register 34 and the standard register 20. During the first clock cycle after a thread switch has been initiated, the thread information in the standard register cell 20 is transferred into the first temporary register 44. At the same time, the second transmission gate 42 is simultaneously directed to transmit the thread information in the first banked shadowed register 34 into the second temporary register 46. During the second clock cycle following thread switch initiation, the thread information in the second temporary register 46 is transferred into the standard register cell 20 while the first transmission gate 40 simultaneously directs the thread information in the first temporary register 44 into the first register 34 of the banked shadowed register file 30. The second and third registers 36, 38 remain idle during the foregoing thread switch operation.

The banked shadowed register file 30 of the present invention thus provides the ability to quickly and efficiently switch between multiple threads without accessing the memory system 22. By reducing the need for accessing the memory system 22, the banked shadowed register file 30 significantly increases the speed at which the current thread's architectural state can be saved, as well as the speed at which instructions from the new thread can be placed in the standard register file 18 for access by the execution core 16. This advantageously reduces the overall thread switch overhead such that the amount time available for the new thread to perform useful work is effectively maximized. As will be appreciated, allows the processor's execution resources to be more fully utilized which results in increased throughput and improved performance. The banked shadowed register file 30 is particularly advantageous in processing applications which involve thread switch operations that are heavily dependent upon main memory 24, such as server applications or transaction processing.

The banked shadowed register file 30 of the present invention is also advantageous in that it effectively transforms a single-threaded processor into a multithreaded processor capable of handling multiple tasks for one or more different users. To accomplish this, the banked shadowed register file 30 has its registers 34–38 coupled to the register cell 20 so as to share the ports of the standard register file 18. This design differs from the prior art technique of coupling separate register files directly to the execution core 16. In so doing, the banked shadowed register file 30 of the present invention does not require adding costly connections to the execution core 16 to simultaneously support multiple states on the execution core 16. This keeps the cost of implementing the banked shadowed register file 30 to a minimum, and furthermore frees up more space on the execution core 16 for additional cache memory.

Figure 3:
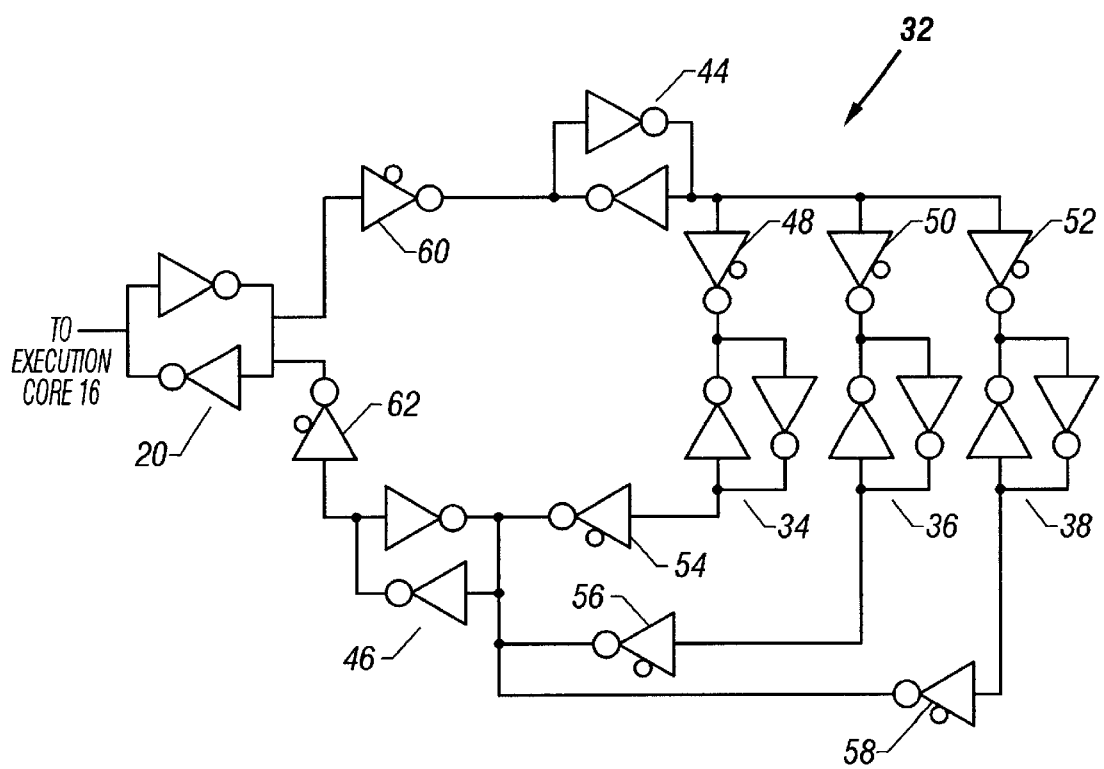
FIG. 3 is a circuit diagram of one embodiment of the banked shadowed register file shown in FIG. 2.

Referring now to FIG. 3, shown is a circuit diagram illustrating one implementation of the banked shadowed register file 30 shown in FIG. 2. In this embodiment, each register comprises a pair of inverters disposed in parallel and juxtaposed relation. This includes the standard register cell 20, the temporary registers 44, 46, and the banked shadowed registers 34–38. The first transmission gate 40 of FIG. 2 comprises a first, a second, and a third tri-state driver 48–52 disposed between the first temporary register 44 and the banked shadowed registers 34–38, respectively. In like fashion, the second transmission gate 42 of FIG. 2 comprises a first, a second, and a third tri-state driver 54–58 disposed between the second temporary register 46 and the banked shadowed registers 34–38, respectively. A first supplemental tri-state driver 60 is provided for selectively controlling the transmission of thread information from the register cell 20 into the first temporary register 44. A second supplemental tri-state driver 62 is similarly provided for selectively controlling the transmission of thread information from the second temporary register 46 to the standard register 20.

The operation of the banked shadowed register file 30 will be described within the context of a thread switch between the third banked shadowed register 38 and the standard register 20. During the first clock cycle of the control signal, the thread information in the register cell 20 is transferred through tri-state driver 60 to the first temporary register 44, while the thread information from the third register 38 is simultaneously transferred through tri-state driver 62 into the second temporary register 46. During the second clock cycle of the control signal, the second supplemental tri-state driver 62 allows the thread information in the second temporary register 46 to proceed into the standard register cell 20. At the same time, the tri-state driver 52 directs the thread information from the first temporary register 44 into the third banked shadowed register 38.

Figure 4:
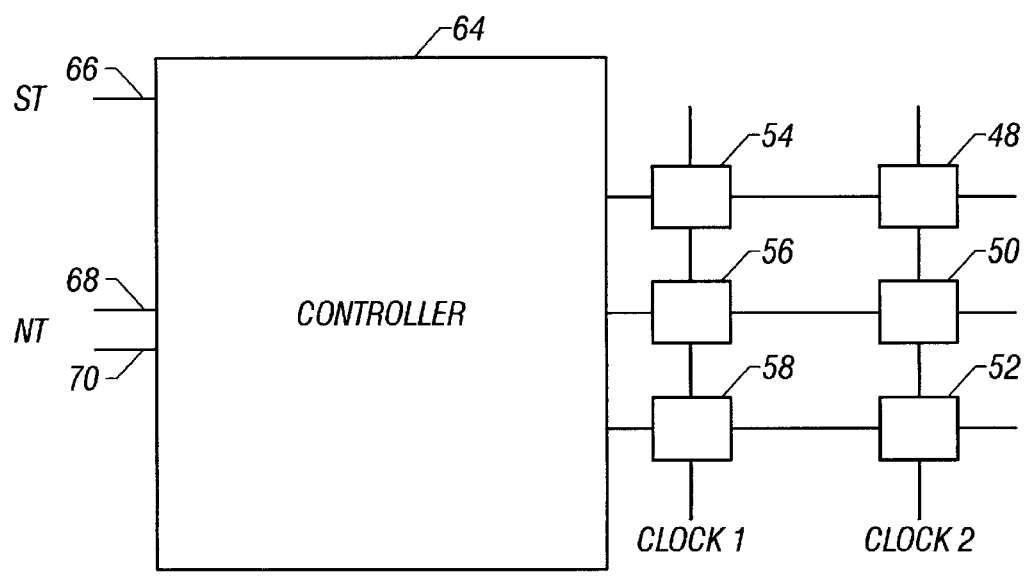
FIG. 4 is a block diagram of a controller 64 for controlling the banked shadowed register file shown in FIG. 3.

With reference to FIG. 4, shown is one embodiment of a controller 64 for use in controlling the banked shadowed register file 30 of the present invention. In the disclosed embodiment, the controller 64 is equipped to receive an ST input signal on line 66 and an NT input signal along lines 68, 70. The ST (switch thread) input signal communicates to the controller 64 that a thread switch operation is desired. The ST input signal preferably comprises a one-bit digital signal lasting one clock pulse. The NT (next thread) input signal is a two-bit digital signal that communicates to the controller 64 which one of the banked shadowed registers 34–38 should be selected for the next thread switch. The NT input signal therefore takes one of three forms. In the disclosed embodiment, an NT input signal comprising a digital 00 designates the first banked shadowed register 34 as the next thread, an NT input signal comprising a digital 01 designates the second banked shadowed register 36 as the next thread, and an NT input signal comprising a digital 10 designates the third banked shadowed register 38 as the next thread.

The controller 64 contains logic that selectively generates and directs a control signal to the various tri-state drivers within the banked shadowed register file 30 depending upon the ST and NT input signals. Moreover, it accomplishes this such that each thread switch process is performed in two discrete steps to avoid corrupting the thread information being transferred. To ensure this, the logic in the controller 64 generates a control signal that, during a first clock cycle (clock 1), is directed to one of the tri-state drivers 54–58 depending on the status of the NT and ST signals received. If an NT signal of 00 and ST signal are received, the control signal will be directed to tri-state driver 56 to initiate a thread switch with the first banked shadowed register 34. If an NT signal of 01 and ST signal are received, the control signal will be directed to tri-state driver 56 to initiate a thread switch with the second banked shadowed register 36. If an NT signal and ST signal are received, the control signal will be directed to tri-state driver 58 to initiate a thread switch with the third banked shadowed register 38.

The logic within controller 64 dictates that ti-state driver 60 is the logic OR of tri-state drivers 54–58. Tri-state driver 60 will therefore simultaneously receive the control signal during the first clock cycle when any of the tri-state drivers 54–58 are activated. In this fashion, the controller 64 mandates that the first step in a thread switch involves the simultaneous sub-steps of: (a) passing thread information from the standard register 20 through tri-state driver 60 to the first temporary register 44; and (b) passing thread information from a selected one of the banked shadowed registers 34–38 through the corresponding tri-state driver 54–58 into the second temporary register 46.

To successfully carry out the second step in a thread switch, the logic in controller 64 directs the control signal, during the succeeding clock cycle (clock 2), to the single tri-state driver 48–52 that corresponds to the single banked shadowed register 34–38 selected as a result of the NT and ST signals. Controller 64 dictates that tri-state driver 62 is the logic OR of tri-state drivers 48–52 such that tri-state driver 62 will simultaneously receive the control signal during the second clock cycle when any of the tri-state drivers 48–52 are activated. The controller 64 therefore mandates that the second step in a thread switch involves the simultaneous sub-steps of: (a) passing thread information from the first temporary register 44 through the appropriate tri-state driver 48–52 into the selected banked shadowed register 34–38; and (b) passing thread information from the second temporary register 46 through tri-state driver 62 into the standard register 20.

It is to be readily understood that the foregoing controller 64 is shown by way of illustration only. Those skilled in the art will recognize that a wide variety of logic implementations may be employed without departing from the spirit and scope of the banked shadowed register file 30 of the present invention.

In summary, the banked shadowed register file 30 of the present invention represents a significant advancement in the field of microprocessing. The banked shadowed register file 30 advantageously reduces thread switch overhead in course grained multithreading by providing the ability to quickly and efficiently switch a plurality of different threads without having to access the memory system 22. Reducing thread switch overhead, in turn, maximizes the amount of time available for the next thread to perform useful work such that the processor's execution resources are more fully utilized. As will be appreciated, this translates into increased throughput over time for improved processor performance.

The banked shadowed register file 30 of the present invention can also be employed to effectively retrofit a conventional single-threaded processor to support multi-threaded processing. The banked shadowed register file 30 accomplishes this by coupling directly to the standard register file 18 rather than the execution core 16 itself. In this fashion, the microprocessor 12 may switch among multiple threads without the need for several individual standard register files coupled directly to the execution core 16. By providing the ability to switch multiple threads without being coupled directly to the execution core 16, the banked shadowed register file 30 of the present invention consumes negligible space on the microprocessor 12. This advantageously avails more space on the microprocessor 12 for such things as additional cache memory.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the invention is to cover all modifications, equivalents, and alternative falling within the spirit and scope of the invention as defined by the appended claims.

What is claimed is:

1. An apparatus, comprising:
    a standard register of a register file coupled to an execution core over a first connection;
    a plurality of shadowed registers to save program thread information;
    an input transmission gate circuit coupled between the standard register and the plurality of shadowed registers over a second connection different than the first connection to transfer first data from the standard register to a first selected one of the plurality of shadowed registers; and
    an output transmission gate circuit coupled between the plurality of shadowed registers and the standard register over a third connection different than the first connection to transfer second data from a second selected one of the plurality of shadowed registers to the standard register.

2. The apparatus of claim 1, further comprising:
    a first temporary register coupled between the standard register and the input transmission gate circuit to temporarily store the first data; and
    a second temporary register coupled between the output transmissiom gate circuit and the standard register to temporarily store the second data.

3. The apparatus of claim 1, further comprising a controller to select the first selected one and second selected one of the plurality of shadowed registers.

4. The apparatus of claim 1, wherein the first selected one of the plurality of shadowed registers and the second selected one of the plurality of shadowed registers are a same register.

5. The apparatus of claim 1, wherein the first selected one of the plurality of shadowed registers and the second selected one of the plurality of shadowed registers are different registers.

6. The apparatus of claim 1, wherein the input transmission gate and output transmission gate have mutually exclusive operation.

7. A method, comprising:
    providing a standard register coupled to an execution core over a first connection;
    providing a plurality of supplemental registers coupled to the standard register over a second connection different than the first connection; and performing a program thread switch in the execution core by:
  transferring a first data from the standard register to a first selected one of the plurality of supplemental registers over the second connection; and
  transferring a second data from a second selected one of the plurality of supplemental registers to the standard register over the second connection.

8. The method of claim 7, wherein the first selected one and second selected one of the plurality of supplemental registers are selected by a control circuit.

9. The method of claim 7, wherein:
transferring the first data includes temporarily storing the first data in a first temporary register; and
transferring the second data includes temporarily storing the second data in a second temporary register.

10. The method of claim 7, wherein:
transferring the first data includes:
  transferring the first data from the standard register to a first temporary register; and
  subsequently transferring the first data from the first temporary register to the first selected one of the plurality of shadowed registers;
transferring the second data includes:
  transferring the second data from the second selected one of the plurality of shadowed registers to a second temporary register; and
  subsequently transferring the second data from the second temporary register to the standard register.

11. The method of claim 10, wherein transferring the first data to the first temporary register and transferring the second data from the second temporary register do not take place at the same time.

12. The method of claim 10, wherein:
transferring the first data from the first temporary register includes passing the first data through a first transmission gate; and
transferring the second data from the second selected one of the plurality of shadowed registers includes passing the second data through a second transmission gate.

13. A machine-readable medium having stored thereon instructions, which when executed by at least one processor cause said at least one processor to perform a thread switch in an execution core by:
  transferring a first thread-based state data from a standard register coupled to an execution core to a first selected one of a plurality of supplemental registers over a first connection not coupled to the execution core; and
  transferring a second thread-based state data from a second selected one of the plurality of supplemental registers to the standard register over a second connection not coupled to the execution core.

14. The medium of claim 13, wherein the first selected one and second selected one of the plurality of supplemental registers are selected by a control circuit.

15. The medium of claim 13, wherein:
transferring the first data includes temporarily storing the first data in a first temporary register; and
transferring the second data includes temporarily storing the second data in a second temporary register.

16. The medium of claim 13, wherein:
transferring the first data includes:
  transferring the first data from the standard register to a first temporary register; and
  subsequently transferring the first data from the first temporary register to the first selected one of the plurality of shadowed registers;
transferring the second data includes:
  transferring the second data from the second selected one of the plurality of shadowed registers to a second temporary register; and
  subsequently transferring the second data from the second temporary register to the standard register.

17. The medium of claim 16, wherein transferring the first data to the first temporary register and transferring the second data from the second temporary register do not take place at the same time.

18. The medium of claim 16, wherein:
transferring the first data from the first temporary register includes passing the first data through a first transmission gate; and
transferring the second data from the second selected one of the plurality of shadowed registers includes passing the second data through a second transmission gate.

19. A computer system, comprising:
a processor having an execution core;
a memory coupled to the processor;
a standard register of a register file coupled to the execution core over a first connection;
a plurality of shadowed registers to save program thread information;
an input transmission gate circuit coupled between the standard register and the plurality of shadowed registers over a second connection different than the first connection to transfer first data from the standard register to a first selected one of the plurality of shadowed registers; and
an output transmission gate circuit coupled between the plurality of shadowed registers and the standard register over a third connection different than the first connection to transfer second data from a second selected one of the plurality of shadowed registers to the standard register.

20. The system of claim 19, further comprising:
a first temporary register coupled between the standard register and the input transmission gate circuit to temporarily store the first data; and
a second temporary register coupled between the output transmission gate circuit and the standard register to temporarily store the second data.

21. The system of claim 19, further comprising a controller to select the first selected one and second selected one of the plurality of shadowed registers.

22. The system of claim 19, wherein the first selected one of the plurality of shadowed registers and the second selected one of the plurality of shadowed registers are a same register.

23. The system of claim 19, wherein the first selected one of the plurality of shadowed registers and the second selected one of the plurality of shadowed registers are different registers.

24. The system of claim 19, wherein the input transmission gate and output transmission gate have mutually exclusive operation.

* * * * *

UNITED STATES PATENT AND TRADEMARK OFFICE
CERTIFICATE OF CORRECTION

PATENT NO.    : 6,298,431 B1
DATED         : October 2, 2001
INVENTOR(S)   : Gottlieb It is certified that error appears in the above-identified patent and that said Letters Patent is hereby corrected as shown below:

Column 7,
Line 16, delete "ti-state" and insert -- tri-state --.

Signed and Sealed this

Sixteenth Day of July, 2002

Attest:

Attesting Officer

JAMES E. ROGAN
Director of the United States Patent and Trademark Office